March 15, 1955  J. F. DOYLE ET AL  2,704,106
METHOD OF MAKING LAMINATED MATERIAL
Filed Dec. 30, 1950
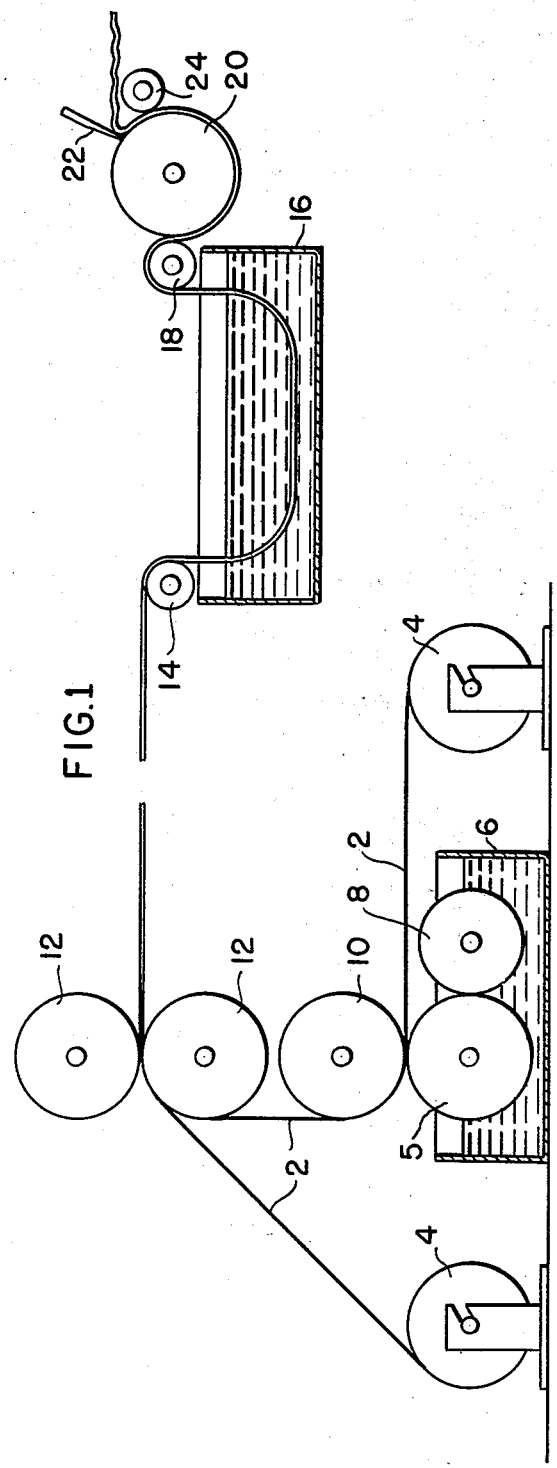
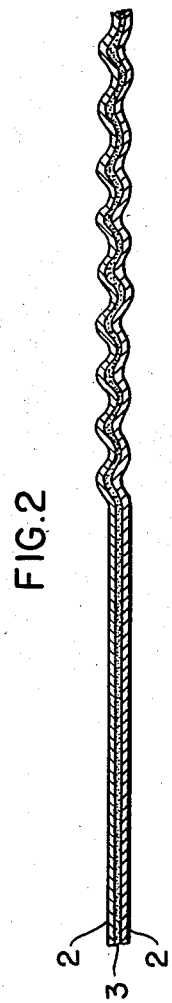
INVENTORS
James F. Doyle
Paul L. Onasch
BY
ATTORNEY

United States Patent Office 2,704,106
Patented Mar. 15, 1955

2,704,106

METHOD OF MAKING LAMINATED MATERIAL

James F. Doyle, Forest Hills, N. Y., and Paul L. Onasch, Hilton Village, Va., assignors to Arkell Safety Bag Company, New York, N. Y., a corporation of New York Application December 30, 1950, Serial No. 203,663

3 Claims. (Cl. 154—33.05)

In the manufacture of laminated crinkled paper such as kraft paper, it has been customary to secure the sheets together previously to crinkling by means of asphalt applied in melted condition. Laminated material of this kind has been extensively used in heavy duty bags and linings where a certain degree of moisture-proofness or water-vapor barrier is required.

Heretofore, in crinkling such laminated paper, considerable difficulty has been experienced owing to the tendency of the asphalt to unevenly flow or squeeze out during the crinkling operation. This results in the asphaltic film or layer varying in thicknesses, with certain areas, especially at the crests of the crinkles on the cylinder side of the material, being too thin to provide the necessary water-vapor barrier. Also, it has been found that in bags and linings made of such laminated material, the asphalt has a tendency to bleed or stain through the paper at the higher temperatures, and to become brittle at the lower temperatures to which such bags or linings are frequently subjected.

The principal object of the invention is to provide a novel and improved method of making laminated material of the character indicated.

The invention is illustrated, by way of example, in the accompanying drawings, in which:

Figure 1 is a diagrammatical side view of two paper webs in the course of being laminated and crinkled in accordance with my invention, parts of the machine employed being shown operating on the webs; and Fig. 2 is a longitudinal sectional view of a portion of the laminated material, a part of the material being shown before and the remainder after crinkling.

In accordance with the present invention, the laminated material consists of a blend of asphalt and an elastomer, the asphalt and the elastomer being in the proportions and of the kind hereinafter described.

The asphalt preferably is of the oxidized or air blown type as distinguished from steam blown.

The elastomer employed may be a reclaimed rubber composition which is adapted to be melted down at a temperature of between 400 degrees and 450 degrees F., to a fluid form comparable to the asphalt when heated to between 350 degrees and 400 degrees F. A reclaimed rubber composition of this nature is put out by the United States Rubber Company under the designation "Indu-Sealz," but there are other similar compositions on the market. The United States Rubber Company has informed us that "Indu-Sealz" consists of reclaimed rubber and a plasticized resin therefor in the proportions of five parts rubber to one part resin.

The asphalt is heated in a container to a temperature of from 350 to 400 degrees F., and the elastomer is melted down at a temperature of between 400 and 450 degrees F., so as to be in fluid form comparable to the heated asphalt.

The elastomer is then poured into the asphalt and the two are agitated until thoroughly mixed, as by means of an "Alsop" mixer.

After mixing, the temperature of the mixture should be lowered to between 250 degrees and 350 degrees F., in order for it to be of the preferred consistency for laminating.

The mixture is preferably from 50 to 67 percent. asphalt and 33 to 50 percent. reclaimed rubber composition.

The paper webs 2 to be laminated may be drawn from supply rolls 4. The adhesive compound 3 thus prepared may be applied in a coating to the inner side of one of the webs 2 by means of a coating roll 5 which receives the mixture from a pan 6, a metering roll 8 and a pressure roll 10 cooperating with the coating roll as customary. The thicknesses of the coating or film may be from 1 to 8 mm. As the webs are fed through the machine, they are brought together between laminating rolls 12. The webs thus laminated pass over a guide roll 14, through a pre-soaking or conditioning tank 16 and over guide roll 18 to a crinkling cylinder 20 where they are crinkled by means of a doctor blade 22, the usual rubber roll 24 engaging the webs in advance of the doctor blade.

The laminated material should be conditioned by the pre-soaking bath in the tank 16 at a temperature between 180 and 210 degrees F., in order for the film to be of the proper consistency for crinkling. If desired the inner surfaces of both webs may be coated. After crinkling the laminated material may be dried and made into bags and linings as customary. If desired, instead of the laminating material passing directly from the laminating rolls to the crinkling cylinder, it may be wound up and subsequently crinkled.

We have found that in laminated material thus produced, the adhesive coating or film is not materially disturbed or otherwise injuriously affected by the crinkling operation, but remains of substantially uniform thickness throughout, and thus uniformly coats the inner sides of the crinkled paper. It retains substantially the same water or water-vapor barrier present in the material before crinkling.

It has also been found that bags made from the material have increased impact strength, and greater elasticity and flexibility when subjected to stress. The laminated material in such bags remain of the desired flexibility well below zero degrees F., and the asphalt reclaimed rubber mixture resists bleeding or staining through penetration into the paper at temperatures well above 200 degrees F., and effective adhesion between the paper layers through temperatures well below zero degrees F., and above 200 degrees F. While it is preferred that the adhesive mixture should consist of from 50 to 67 per cent. asphalt to 50 to 33 per cent. reclaimed rubber composition, the rubber content may be varied depending upon the elasticity desired in the resulting product. The blended adhesive through increased viscosity, and the laminated paper is thus susceptible to temperature changes.

While our improved adhesive is particularly adapted for use in making laminations of crinkled paper as above described, it is also suitable for use in securing together the non-nested crinkled paper plies of the bag and composite material of the patent to Greene No. 2,314,876, dated March 30, 1943.

What we claim is:

1. The method of making laminated material of the class described which comprises feeding two paper webs longitudinally, coating the inner side of at least one of the webs with a film of adhesive of substantially uniform thickness comprising a mixture of substantially from 50 to 67 percent. asphalt and from 50 to 33 percent. reclaimed rubber composition of the kind described, the adhesive being applied in fluid condition at a temperature of from 250 to 350 degrees F., bringing the webs together so as to cause them to be secured together by the adhesive, passing the web through a pre-soaking bath to condition it at a temperature between 180 and 210 degrees F., and crinkling the composite web thus conditioned, said reclaimed rubber and asphaltic adhesive film thus applied and the composite web thus conditioned, within said ranges of temperatures, resulting in the film being of such consistency that its uniformity of thickness is substantially unaffected by the crinkling of the composite web.

2. The method of making laminated material of the class described which comprises feeding two paper webs longitudinally, coating the inner side of at least one of the webs with a film of adhesive of substantially uniform thickness comprising a mixture of asphalt having a melting point of substantially from 155 to 180 degrees F., and an elastomer having a melting point of substantially 400 to 450 degrees F., the adhesive mixture being applied in fluid condition at a temperature of from 250 to 350 degrees F., bringing the webs together so as to cause them to be secured together by the adhesive, passing the web through a pre-soaking bath to condition it at a temperature between 180 and 210 degrees F., and crinkling the composite web thus conditioned, said reclaimed rubber and asphaltic adhesive film thus applied and the composite web thus conditioned, within said ranges of temperatures, resulting in the film being of such consistency that its uniformity of thickness is substantially unaffected by the crinkling of the composite web.

3. The method of making laminated material of the class described which comprises heating asphalt having a melting point of substantially from 155 degrees to 180 degrees F., and a reclaimed rubber composition of the kind described in separate batches, the asphalt being heated to a temperature from 350 to 400 degrees F., and the reclaimed rubber composition to a temperature from 400 and 450 degrees F., so as to cause the composition to be in fluid form comparable to the thus heated asphalt, and thoroughly mixing the thus heated asphalt and composition together, the mixture containing from 50 to 76 percent. of asphalt, and from 33 percent. to 50 percent. of said composition, feeding two webs of paper longitudinally, coating the inner side of at least one of the webs with a film of said mixture applied in fluid condition at a temperature of from 250 to 350 degrees F., bringing the webs together so as to cause them to be secured by the adhesive mixture, passing the composite web through a pre-soaking bath to condition it at a temperature between 180 and 210 degrees F., and crinkling the composite web thus conditioned, said reclaimed rubber and asphaltic adhesive film being of substantially uniform thickness, and said film thus applied and the composite web thus conditioned, within said ranges of temperatures, resulting in the film being of such consistency that its uniformity of thickness is substantially unaffected by the crinkling of the composite web.

References Cited in the file of this patent

UNITED STATES PATENTS

| Number | Name | Date |
|---|---|---|
| 1,603,932 | Angier | Oct. 19, 1926 |
| 1,991,300 | Tichy et al. | Feb. 12, 1935 |
| 2,079,273 | Angier | May 4, 1937 |
| 2,102,838 | Dillehay | Dec. 21, 1937 |
| 2,288,293 | Metcalf | June 30, 1942 |
| 2,296,275 | Ghez | Sept. 22, 1942 |
| 2,470,141 | Caves | May 17, 1949 |
| 2,522,857 | Butler | Sept. 19, 1950 |